(12) United States Patent
Böhm

(10) Patent No.: US 12,049,951 B2
(45) Date of Patent: Jul. 30, 2024

(54) PUMP STAGE ASSEMBLY, EXTERNAL GEAR PUMP, USE OF A PUMP STAGE ASSEMBLY AND VEHICLE TRANSMISSION

(71) Applicant: Vitesco Technologies GmbH, Regensburg (DE)

(72) Inventor: Christian Böhm, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 220 days.

(21) Appl. No.: 17/620,310

(22) PCT Filed: Jun. 17, 2020

(86) PCT No.: PCT/EP2020/066834
§ 371 (c)(1),
(2) Date: Dec. 17, 2021

(87) PCT Pub. No.: WO2020/254450
PCT Pub. Date: Dec. 24, 2020

(65) Prior Publication Data
US 2022/0243803 A1    Aug. 4, 2022

(30) Foreign Application Priority Data
Jun. 18, 2019    (DE) .................... 10 2019 208 847.3

(51) Int. Cl.
*F16H 57/04*    (2010.01)
*F04C 2/18*    (2006.01)
(Continued)

(52) U.S. Cl.
CPC .......... *F16H 57/0436* (2013.01); *F04C 2/18* (2013.01); *F04C 23/001* (2013.01);
(Continued)

(58) Field of Classification Search
CPC ............ F16H 57/0436; F16H 57/0453; F16H 57/0476; F04C 2/18; F04C 29/025;
(Continued)

(56) References Cited

U.S. PATENT DOCUMENTS 8,640,452 B2 *   2/2014   Schultz ............... F16H 61/0031
                                                                   60/486
10,815,991 B2 *  10/2020  Kowalski ................ F04C 15/06
10,837,446 B2 *  11/2020  Hong ...................... F04C 28/24
(Continued)

FOREIGN PATENT DOCUMENTS

CN          2846807 Y     12/2006
CN        207554328 U      6/2018
(Continued)

OTHER PUBLICATIONS

JPH03107516—Machine Translation (Year: 1991).*
(Continued)

*Primary Examiner* — Michael A Riegelman
(74) *Attorney, Agent, or Firm* — Cozen O'Connor

(57) ABSTRACT

A pump stage assembly for supplying lubricating oil, comprising: at least two pump suction stages and at least one pump pressure stage. The pump suction stages and the pump pressure stage are spaced apart from one another in a pump housing PG and have a common drive shaft. The pump suction stages are formed by a first assembly of at least three intermeshing external gearwheels and wherein the pump pressure stage is formed by a second assembly of two intermeshing external gearwheels. Here at least two respective tooth center points of the first external gearwheel assembly and the respective tooth center points of the second external gearwheel assembly are arranged in a common plane E-E which intersects the pump housing PG in a longitudinal direction.

16 Claims, 8 Drawing Sheets

(51) Int. Cl.
  *F04C 23/00* (2006.01)
  *F04C 29/02* (2006.01)
(52) U.S. Cl.
  CPC ....... *F04C 29/025* (2013.01); *F16H 57/0453* (2013.01); *F16H 57/0476* (2013.01); *F04C 2240/30* (2013.01)
(58) Field of Classification Search
  CPC .............. F04C 23/001; F04C 2240/30; F01M 2011/0083; F01M 2001/126; F01M 2001/123
  See application file for complete search history.

(56) References Cited

U.S. PATENT DOCUMENTS

| | | | | |
|---|---|---|---|---|
| 2002/0053489 | A1* | 5/2002 | Schnitzer | F01M 1/02 184/6.12 |
| 2002/0062714 | A1* | 5/2002 | Albert | F16H 61/30 74/606 R |
| 2009/0123314 | A1* | 5/2009 | Wockel | F04C 2/18 418/9 |
| 2009/0241535 | A1* | 10/2009 | Schultz | F16H 61/0025 60/486 |
| 2016/0281712 | A1* | 9/2016 | Muizelaar | F04C 11/008 |
| 2017/0107872 | A1* | 4/2017 | McGowan | F01M 1/12 |
| 2017/0210315 | A1* | 7/2017 | Nakajima | F16N 7/385 |
| 2022/0243803 | A1* | 8/2022 | Böhm | F04C 23/001 |
| 2022/0356941 | A1* | 11/2022 | Böhm | F16H 57/0453 |

FOREIGN PATENT DOCUMENTS

| | | |
|---|---|---|
| DE | 1100375 | 2/1961 |
| DE | 3916528 | 11/1990 |
| DE | 10051356 | 4/2002 |
| DE | 10305781 | 5/2005 |
| DE | 102009015319 | 10/2009 |
| DE | 102011008607 | 9/2011 |
| DE | 102015002035 | 8/2016 |
| DE | 102016115564 | 3/2017 |
| EP | 0305689 | 3/1989 |
| EP | 2589851 | 5/2013 |
| JP | H03107516 | 5/1991 |
| JP | H 03-237207 | 10/1991 |
| JP | H0559925 | 3/1993 |
| JP | 2006132342 | 5/2006 |
| WO | WO 00/68601 | 11/2000 |
| WO | WO 2014/147588 | 9/2015 |

OTHER PUBLICATIONS

Office Action dated Jul. 21, 2023 issued in German Patent Application No. 102019208847.3.
Office Action dated Aug. 15, 2023 issued in Chinese Patent Application No. 202080045097.1.
Office Action of the corresponding German Patent Application No. 10 2019 208 847.3.

* cited by examiner

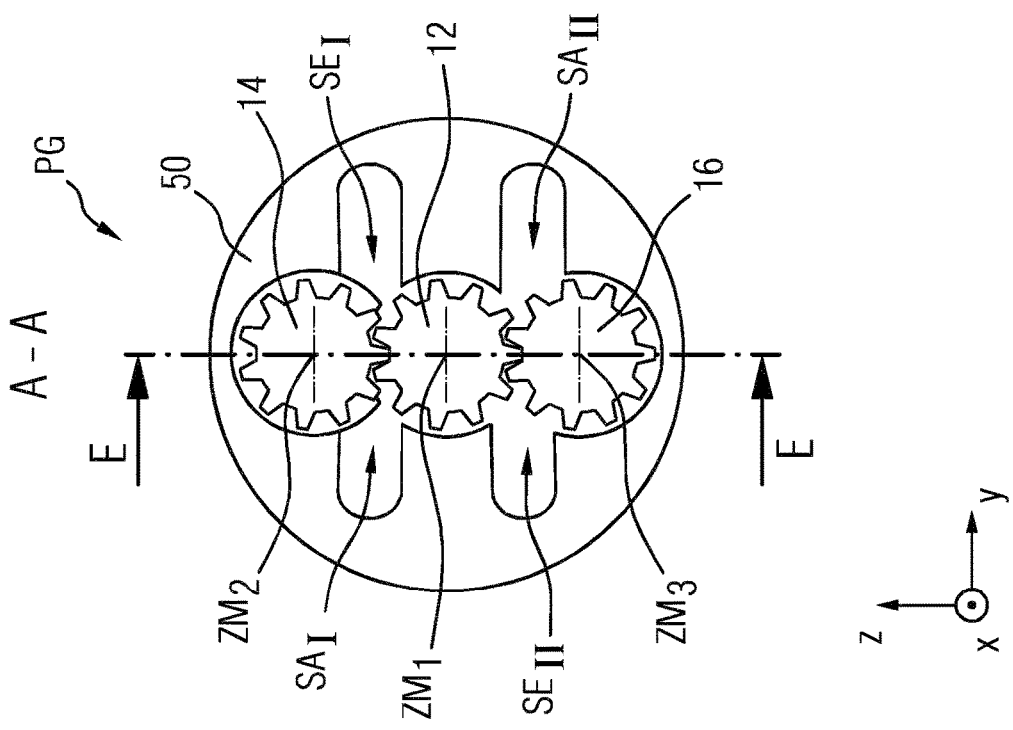
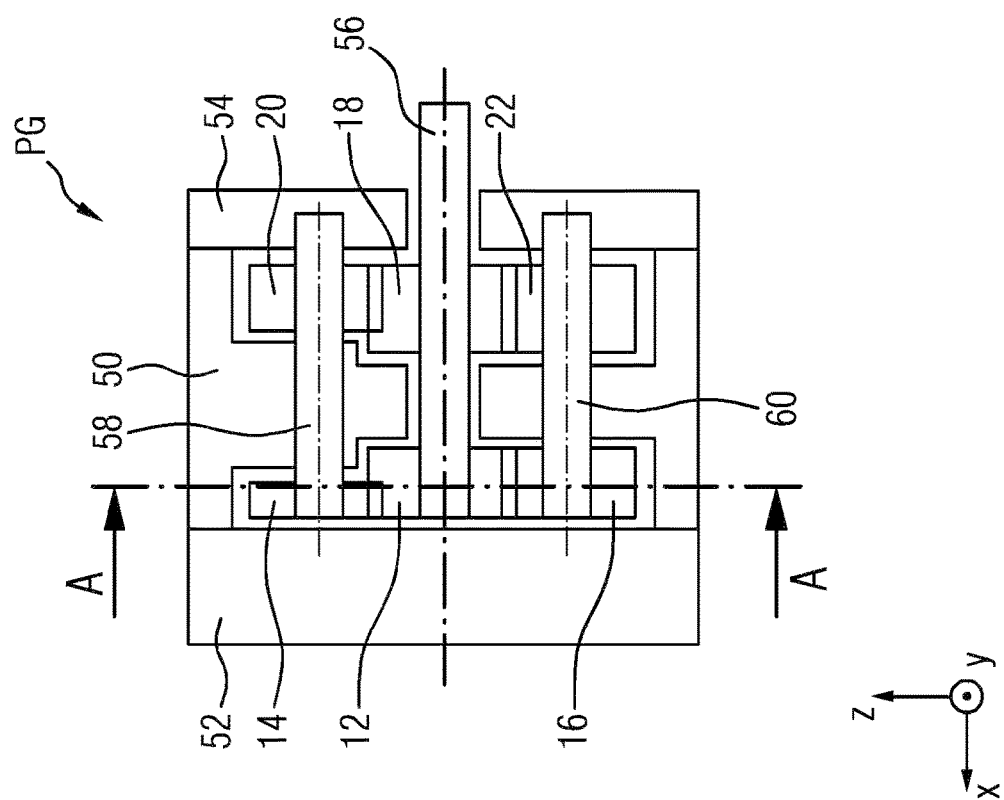

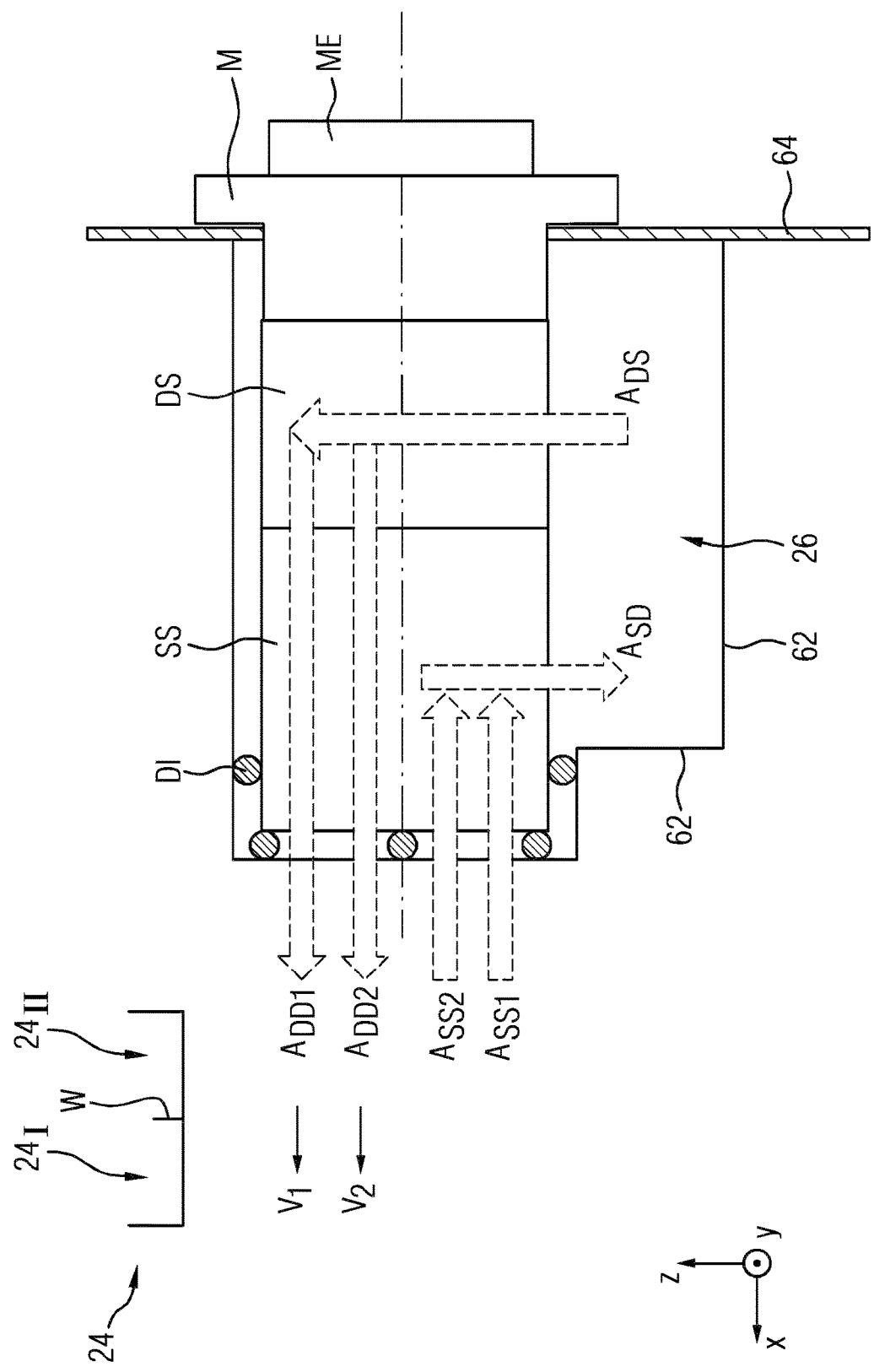

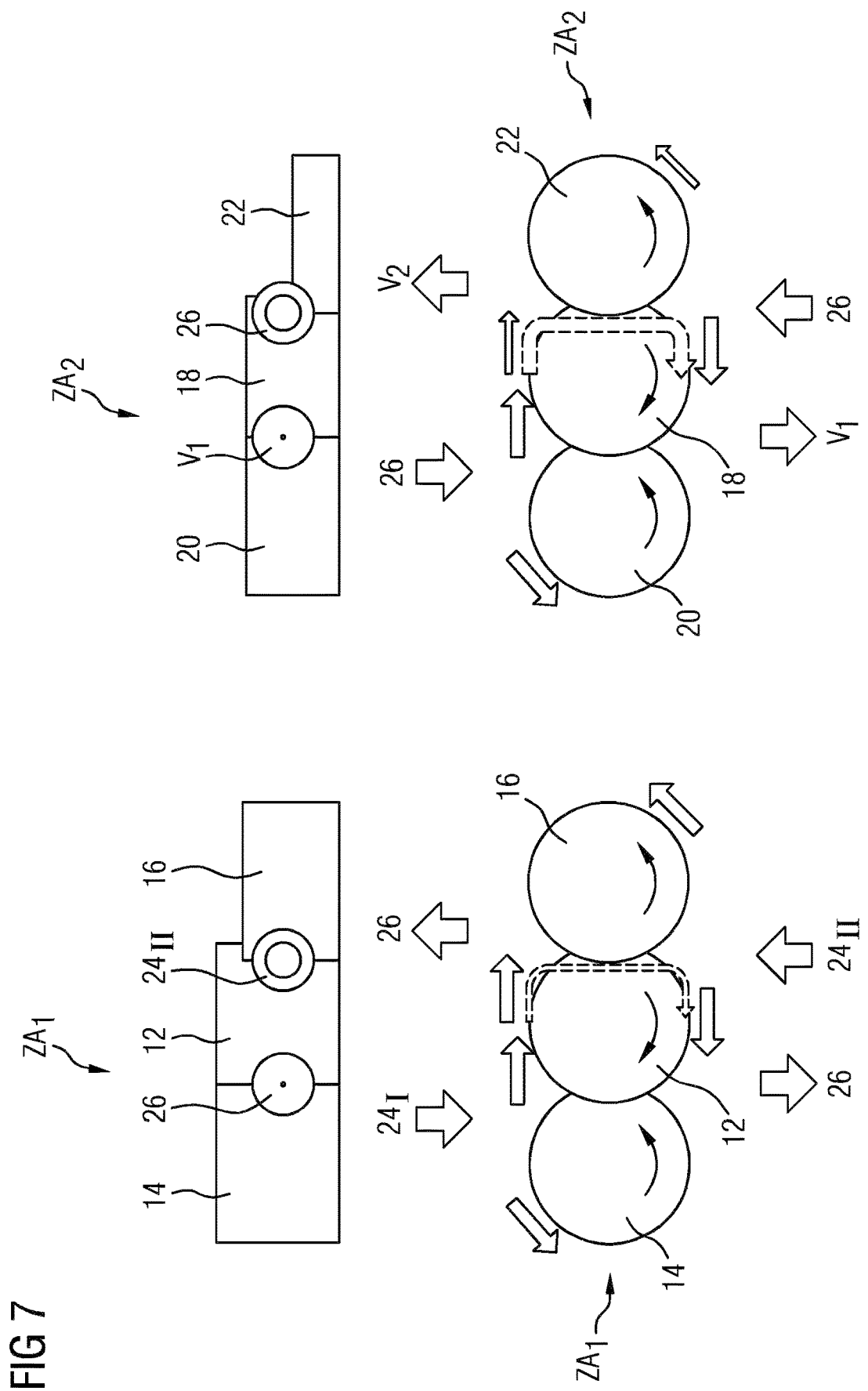

PUMP STAGE ASSEMBLY, EXTERNAL GEAR PUMP, USE OF A PUMP STAGE ASSEMBLY AND VEHICLE TRANSMISSION

CROSS REFERENCE TO RELATED APPLICATIONS

This is a U.S. national stage of Application No. PCT/EP2020/066834 filed Jun. 17, 2020. Priority is claimed on German Application No. DE 10 2019 208 847.3 filed Jun. 18, 2019 the content of which is incorporated herein by reference.

BACKGROUND OF THE INVENTION

1. Field of the Invention

The present disclosure relates to a pump stage assembly for supplying lubricating oil to at least one consumer. The present disclosure furthermore concerns a use of such a pump stage assembly for supplying lubricating oil to an at least one-stage or two-stage transmission for driving a vehicle, in particular an electric vehicle, and a vehicle transmission.

2. Description of the Related Art

In vehicles, so-called wet sump lubrication systems or dry sump lubrication systems are used for lubricating internal combustion engines and transmissions.

Here, a dry sump lubrication system is normally only used in sports cars, off-road vehicles, and motorcycles. It provides lubrication even at extreme turning speeds or on sloping off-road travel, in that it prevents lubricating oil from flowing out of a region of an intake connector of an oil pump under high centrifugal forces or at corresponding sloping attitudes. This is guaranteed since, as well as an oil pan which is kept dry (in contrast to a wet sump lubrication system), a separate oil tank is also used to store the lubricating oil. The oil pan, which is kept dry is also referred to as an oil sump, also known as a dry sump, from which usually a mixture of lubricating oil and air is drawn in.

Because of a smaller volume of such an oil pan, a dry sump lubrication system offers greater ground clearance so that e.g. an engine can be installed lower, which is in turn associated with a lower center of gravity—a feature which benefits the above-mentioned sports cars or off-road vehicles.

A dry sump lubrication system comprises one or more pump suction stages for delivering the lubricating oil from the oil sump to the oil tank, and one or more pump pressure stages for delivering the lubricating oil from the oil tank to a consumer. The delivery volume of the pump pressure stages is always lower than the delivery volume of the pump suction stages.

SUMMARY OF THE INVENTION

It is an object of one aspect of the present invention to improve a dry sump lubrication system.

One aspect of the invention is a pump stage assembly. One aspect of the invention is protection for a multiple action, external gear pump with such a pump stage assembly, a use of such a pump stage assembly for supplying lubricating oil to an at least one-stage or two-stage transmission for driving a vehicle, in particular an electric vehicle, and a vehicle transmission with such a pump stage assembly.

Advantageous embodiments of the invention form the subject matter of the dependent claims.

A pump stage assembly is proposed for supplying lubricating oil to at least one consumer. The pump stage assembly comprises:
- at least two pump suction stages for drawing in a lubricating oil from a first oil container functioning as a dry sump, and for delivering the lubricating oil to a second oil container functioning as an oil tank, and
- at least one pump pressure stage for drawing in the lubricating oil from the second oil container and delivering it to the consumer.

The pump suction stages and the pump pressure stage are arranged spaced apart from one another in a pump housing and have a common drive shaft.

The pump suction stages are formed by a first assembly of at least three intermeshing external gearwheels which lie in a first plane. The pump pressure stage however is formed by a second assembly of two intermeshing external gearwheels, wherein the first plane and the second plane lie parallel to one another.

Via a first inlet, a first delivery volume flow can be drawn in from a first region of the first oil container by a first pump suction stage, and via a second inlet, a second delivery volume flow can be drawn in from a second region of the first oil container by a second pump suction stage. The two delivery volume flows intermix in the pump housing before they reach the second oil container via a respective outlet.

It is furthermore proposed that at least two of the respective tooth center points of the first external gearwheel assembly and the respective tooth center points of the second external gearwheel assembly are arranged in a common third plane that intersects the pump housing in a longitudinal direction and lies orthogonally to the first and second planes.

The proposed pump stage assembly advantageously allows implementation of a dry sump system with only five external gearwheels. The proposed pump stage assembly constitutes a very compact pump solution. The number of rotating components is kept to a minimum, which is associated with a reduction in friction losses. Also, weight is saved.

In principle, these external gearwheel assemblies can be expanded accordingly as required.

In one embodiment of the present invention, as well as at least two pump suction stages, at least two pump pressure stages are provided that are formed by the second assembly of at least three intermeshing external gearwheels, wherein the at least two of the respective tooth center points of the first external gearwheel assembly and at least two of the respective tooth center points of the second external gearwheel assembly are arranged in the common plane.

Here, via a first inlet, a first delivery volume flow can be drawn out of the second oil container or oil tank by a first pump pressure stage, and via a second inlet, a second delivery volume flow can be drawn in by a second pump pressure stage. The two delivery volume flows intermix in the pump housing before they reach the respective consumer via a respective outlet.

The proposed embodiment advantageously allows implementation of a dry sump system with only six external gearwheels. This embodiment also constitutes a very compact pump solution in which the number of rotating components is kept to a minimum.

According to a further, particularly advantageous aspect of the present invention, the respective tooth center points of all gearwheels of the first external gearwheel assembly and the respective tooth center points of all gearwheels of the second external gearwheel assembly are arranged in said plane. This allows overall an even more compact pump solution.

It is furthermore proposed that the first oil container and/or the second oil container form an oil reservoir in the interior of an at least one-stage or two-stage transmission for driving a vehicle, in particular an electric vehicle.

According to one aspect of the present invention, the pump stage assembly is configured as part of a plug-in pump solution for arrangement on an at least one-stage or two-stage transmission for driving a vehicle, in particular an electric vehicle, wherein the plug-in pump solution is flanged to a housing of the transmission and protrudes into the housing. The plug-in pump solution may advantageously be configured as a substantially cylindrical body, wherein the pump housing forming the cylindrical body is at least partially or suitably at least mostly injection-molded from a plastic.

According to one aspect of the present invention, a hydraulic connection of the pump suction stages and/or the at least one pump pressure stage to the transmission oil reservoir is designed radially to the respective portion of the pump housing. This allows an even more compact pump solution. Here, a hydraulic connection to the pressure side of the at least one pump pressure stage may be provided on the face of the end of the pump housing protruding into the transmission housing.

According to one aspect of the present invention, a hydraulic connection to the suction side of the pump suction stages may be provided on a face of an end of the pump housing protruding into the transmission housing.

According to one aspect of the present invention, a hydraulic connection to the pressure side of the pump suction stages and to the suction side of the at least one pump pressure stage may be provided on the face of the end of the pump housing protruding into the transmission housing.

According to one aspect of the present invention, the common drive shaft may be driven by electric motor and/or mechanically.

Furthermore, a multiple action, external gear pump with a pump stage assembly of the type described above is proposed.

Furthermore, use of the pump stage assembly described above is proposed for supplying lubricating oil to an at least one-stage or two-stage transmission for driving a vehicle, in particular an electric vehicle.

It is also proposed to use the pump stage assembly for cooling an electric motor driving the electric vehicle.

In addition, a vehicle transmission is proposed for driving a vehicle, in particular an electric vehicle, wherein the vehicle transmission has a pump stage assembly of the type described above.

BRIEF DESCRIPTION OF THE DRAWINGS

Further advantageous developments of the present invention will emerge from the dependent claims and from the following description of preferred embodiments. The drawing shows schematically:

FIG. 2A is a pump housing PG with the two gearwheel assemblies $ZA_1$, $ZA_2$ shown in FIG. 1;

FIG. 2B is cross section along line A-A of the pump housing PG shown in FIG. 2A;

FIG. 3 is a plug-in pump solution;

FIG. 7 an illustration of delivery flows.

DETAILED DESCRIPTION OF THE PRESENTLY PREFERRED EMBODIMENTS

Figure 1:
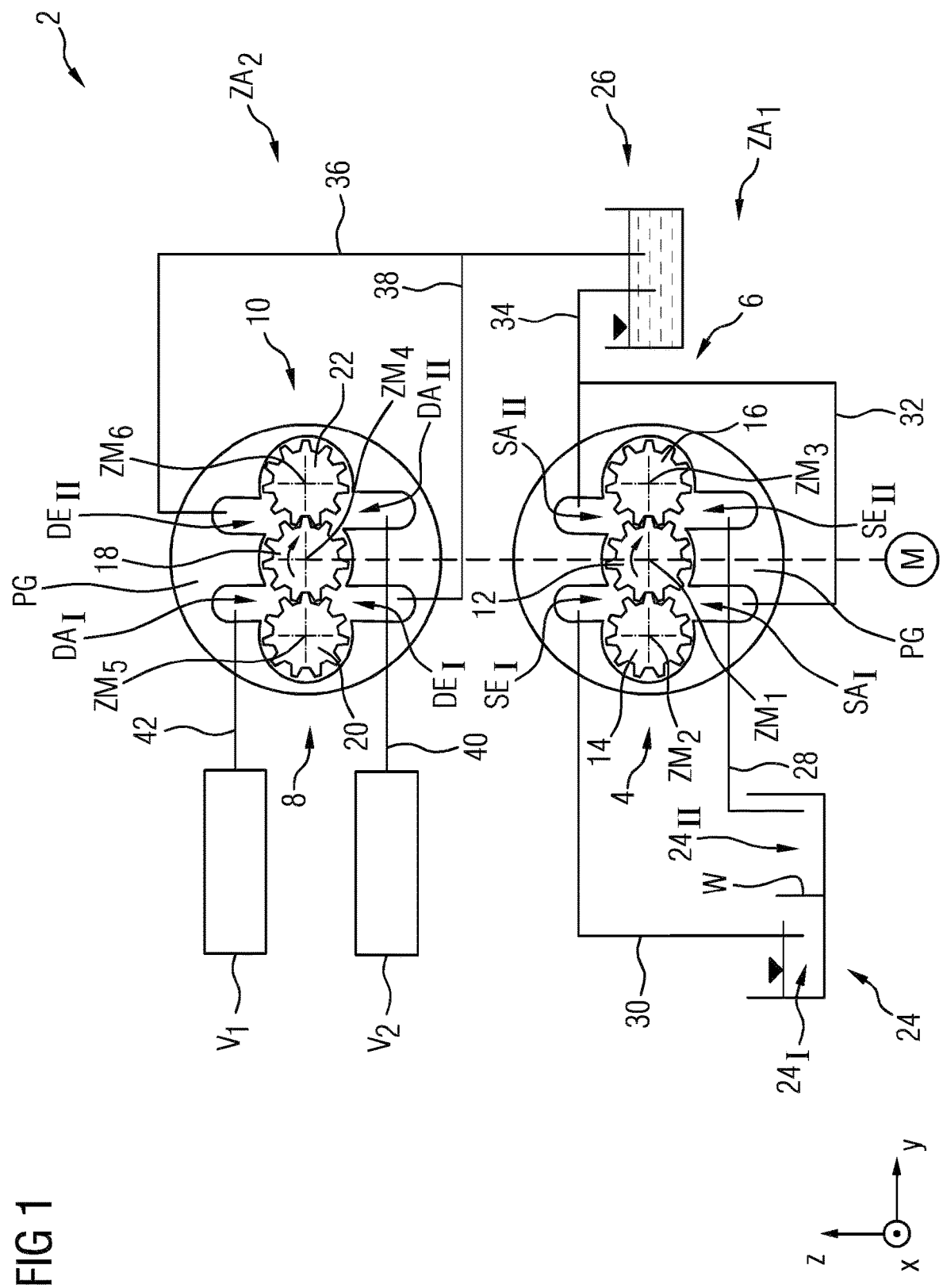
FIG. 1 is a first gearwheel assembly $ZA_1$ forming two pump suction stages, and combined therewith a second gearwheel assembly $ZA_2$ forming two pump pressure stages.

FIG. 1 illustrates a pump stage assembly 2 as part of a multiple action, external gear pump that serves firstly for supplying lubricating oil to an at least a one-stage or two-stage vehicle transmission $V_1$ for driving an electric vehicle, and secondly for cooling an electric motor $V_2$ for driving the electric vehicle, which motor forms a drive unit with the vehicle transmission $V_1$.

The pump stage assembly 2 comprises two pump suction stages 4, 6 for drawing in a lubricating oil from a first oil container 24, functioning as a dry sump, and for conveying the lubricating oil to a second oil container 26 (the actual oil container or oil tank), and two pump pressure stages 8, 10 for drawing in the lubricating oil from the second oil container 26 and delivering it to the two consumers $V_1$, $V_2$.

Figure 4:
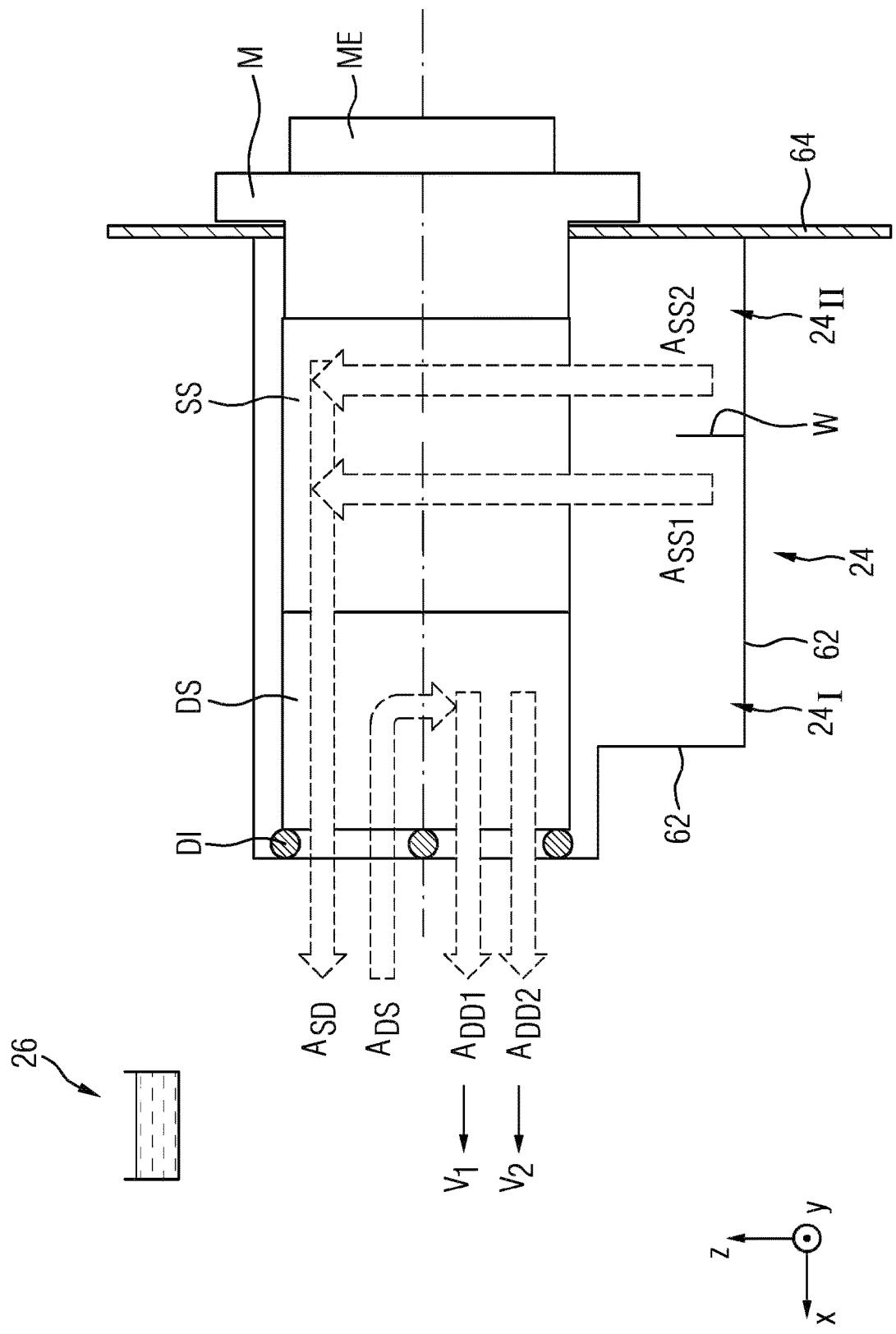
FIG. 4 is a plug-in pump solution.
Figure 5:
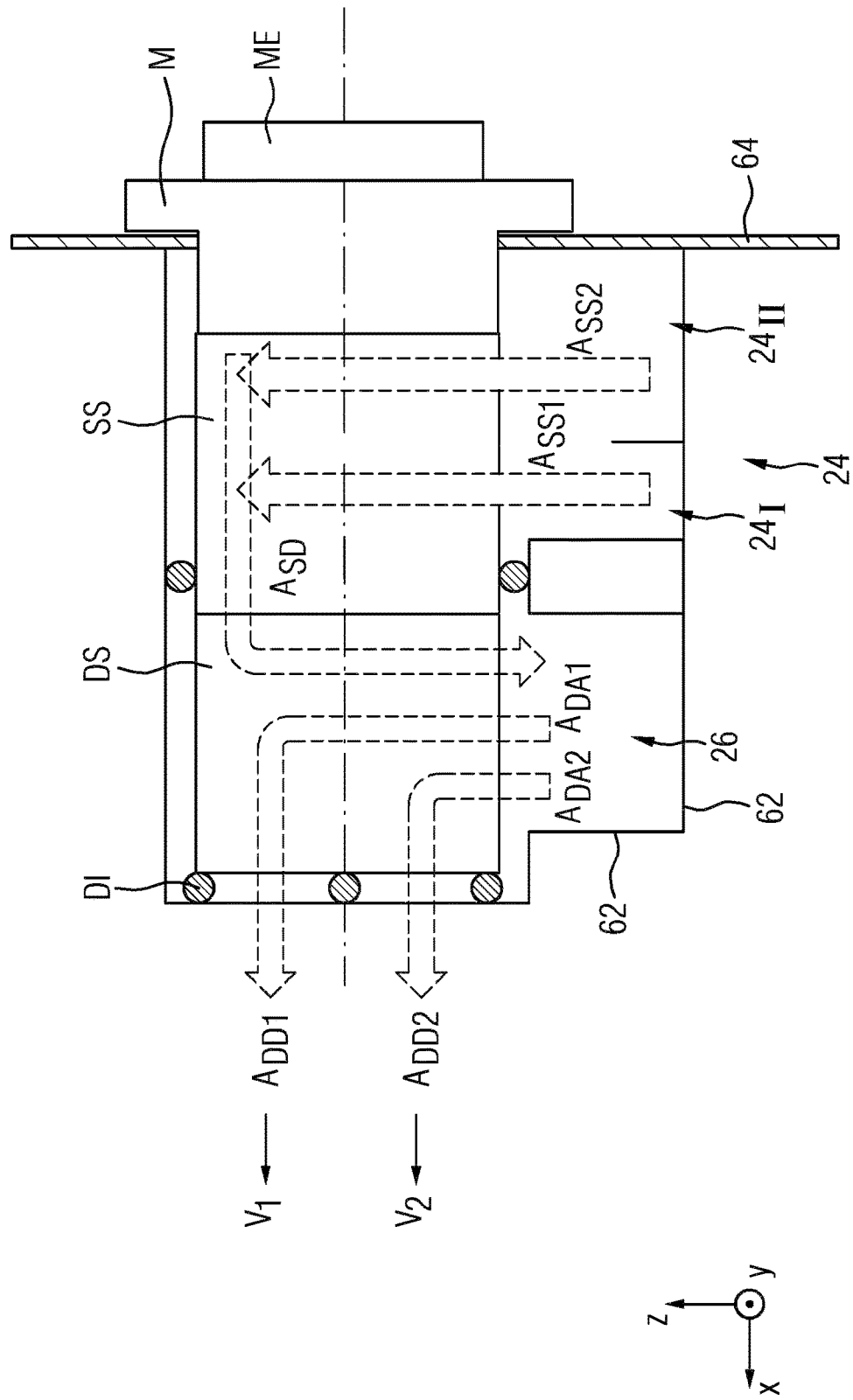
FIG. 5 is a plug-in pump solution.

The pump stage assembly 2 is part of an at least substantially cylindrical plug-in pump solution, which is flanged to a housing 62, 64 of the vehicle transmission, wherein the plug-in pump solution protrudes into the housing 62, 64 (see FIG. 3, FIG. 4, FIG. 5). The pump housing PG forming the cylindrical body is advantageously injection-molded from a plastic.

The pump suction stages 4, 6 and the pump pressure stages 8, 10 are arranged spaced apart from one another in the pump housing PG and have a common drive shaft 56. This drive shaft 56 is driven by an electric motor (E-motor) M in the context of the embodiments proposed here. In principle however, the plug-in pump solutions could also be driven purely mechanically.

The pump suction stages 4, 6 are formed by a first assembly $ZA_1$ of three intermeshing external gearwheels 12, 14, 16, whereas the pump pressure stages 8, 10 are formed by a second assembly $ZA_2$ of three intermeshing external gearwheels 18, 20, 22. The external gearwheel assembly $ZA_1$ lies in a first plane, and the external gearwheel assemblies $ZA_2$ lie in a second plane parallel thereto. FIG. 2 illustrates a pump housing PG with a housing part 50 which receives both the two external gearwheel assemblies $ZA_1$, $ZA_2$ and also the drive shaft 56 and two axles 58, 60. The drive shaft 56 extends through the gearwheels 12, 18 and drives these, while the axle 58 extends through the driven gearwheels 14, 20 and the axle 60 through the driven gearwheels 16, 22. With a corresponding design, instead of the axles 58, 60, shafts 58, 60 may be provided. The housing part 50 is joined to a first housing cover 52 and a second housing cover 54 (see FIG. 2). The pump housing PG, 50, 52, 54 is furthermore combined with the above-mentioned electric motor M, which drives the drive shaft 56 on which the two driving gearwheels 12, 18 are arranged.

The respective tooth center points $ZM_1$, $ZM_2$, $ZM_3$ of all gearwheels of the first external gearwheel assembly $ZA_1$ and the respective tooth center points $ZM_4$, $ZM_5$, $ZM_6$ of all gearwheels of the second external gearwheel assembly $ZA_2$ are arranged in a common third plane E-E which intersects the pump housing PG in a longitudinal direction or longitudinal extent X-X (see FIG. 2). The plane E-E lies orthogonally to the above-mentioned first and second planes of the respective external gearwheel assembly $ZA_1$, $ZA_2$.

Depending on the fill level, the lubricating oil or—and this is normally the case—only a mixture of lubricating oil and air is drawn in via two intake lines 28, 30, which each protrude into a respective one of two regions 24$_I$, 24$_{II}$ of the dry sump 24, which is divided by a wall W. The wall W dividing the dry sump 24 helps evacuate the dry sump 24, because the dry sump 24 must be kept as dry or empty as possible in all vehicle positions.

Figure 1A:
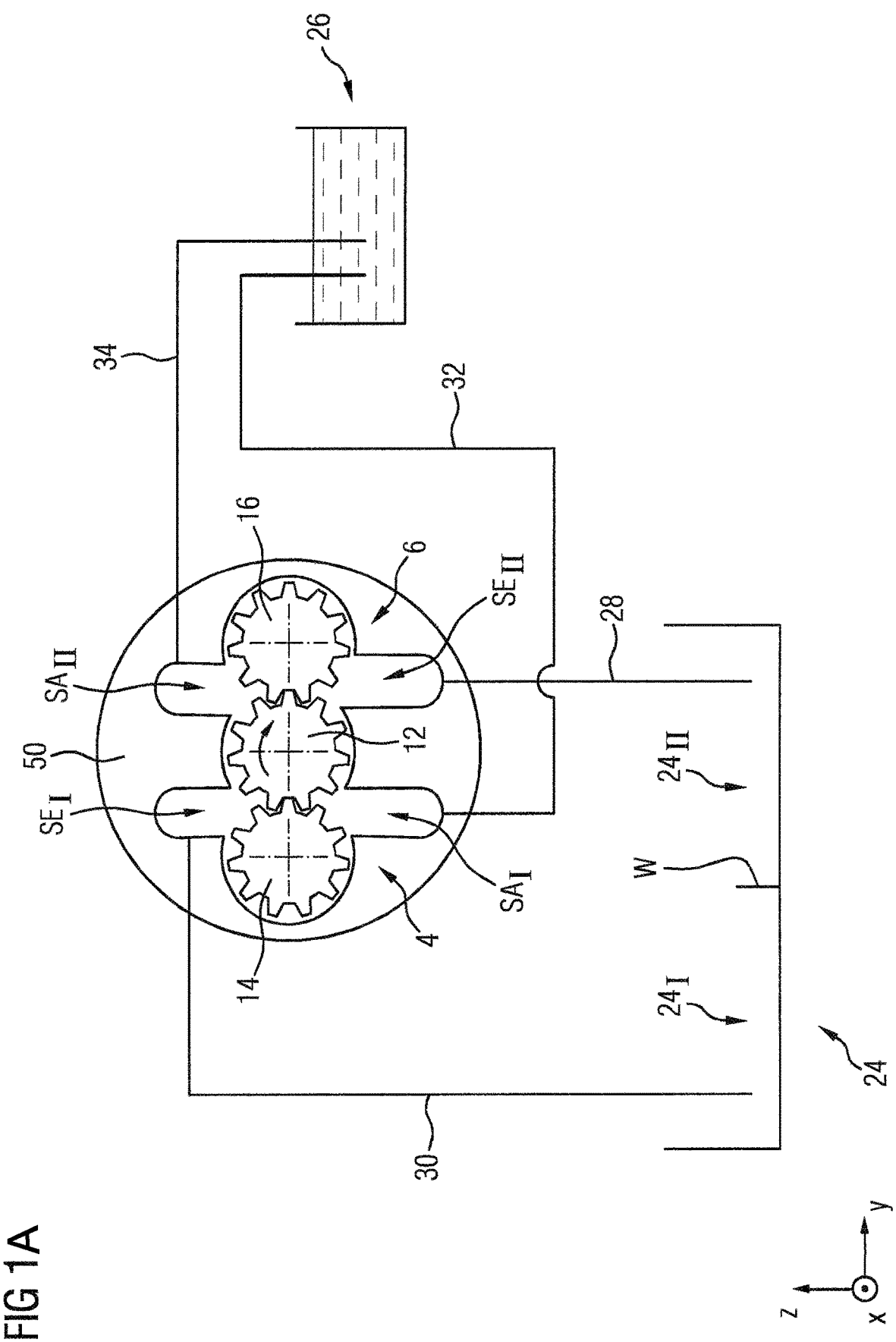
FIG. 1A the first gearwheel assembly $ZA_1$ shown in FIG. 1 in an enlarged depiction.

The intake line 30 leads to a first pump suction stage suction connection $SE_I$ of the first pump suction stage 4 formed by the two gearwheels 12, 14, while the suction line 28 leads to a second pump suction connection $SE_{II}$ of the second pump suction stage 6 formed by the two gearwheels 12, 16. A line 32 leads from the first pump suction stage pressure connection SA', also formed by the two gearwheels 12, 14, to the oil tank 26. Similarly, a line 34 leads from the second pump suction stage pressure connection $SA_{II}$, also formed by the two gearwheels 12, 16, to the oil tank 26 (see FIG. 1a). Alternatively, the line 32 may also open into the line 34, which then opens in the oil tank (see FIG. 1).

Via a suction line 36, the lubricating oil is then conveyed firstly via a first pump pressure stage suction connection DE' (see intake line 38, which branches from the intake line 36 and leads to the pump pressure stage suction connection $DE_I$) and a first pump pressure stage pressure connection $DA_I$ of the first pump pressure stage 8—each formed by the two gearwheels 18, 20—and a line 42 to the vehicle transmission $V_1$. Secondly, the lubricating oil is also conveyed via a second pump pressure stage suction connection $DE_{II}$ and a second pump pressure stage pressure connection $DA_{II}$ of the second pump pressure stage 10—each formed by the two gearwheels 18, 22—and a line 42 to the electric motor $V_2$.

In a proposed first embodiment of the plug-in pump solution (see FIG. 3), an oil tank 26 is formed in the interior of the transmission housing 62, 64. A single one or two pump pressure stage(s) DS is/are arranged between the electric motor M, arranged on the transmission wall side, and two pump suction stages SS. The hydraulic connection of the suction side of the pump pressure stage(s) DS (see intake $A_{DS}$) firstly, and of the pressure stage (see outlet $A_{SD}$) of the pump suction stages SS secondly, to the oil tank 26 are each designed radially to the respective portion of the pump housing PG. The pump pressure stage(s) DS is/are accordingly sealed circumferentially against the pump suction stages SS (see seal DI). A hydraulic connection of the pump plug-in solution to a dry sump 24 (separate therefrom) firstly, and to the two above-mentioned consumers secondly, is provided in each case on the face of the pump end protruding into the transmission housing 62, 64 (see intake $A_{SS1}$, intake $A_{SS2}$ of the respective suction stage SS and outlet $A_{DD1}$, outlet $A_{DD2}$ of the respective pressure stage DS).

Alternatively, in a proposed second embodiment of the plug-in pump solution (see FIG. 4), a dry sump 24 is formed in the interior of the transmission housing 62, 64. Two pump suction stages SS are arranged between an electric motor M, arranged on the transmission wall side, and two pump pressure stages DS. The hydraulic connection of the two pump suction stages SS (see intake $A_{SS1}$, intake $A_{SS2}$) to the dry sump 24 is in each case designed radially to the pump housing PG. The pump pressure stages DS are accordingly sealed circumferentially against the pump suction stages SS (see seal DI). A hydraulic connection of the plug-in pump solution to an oil tank 26 (separate therefrom) firstly, and to the two above-mentioned consumers $V_1$, $V_2$ secondly, is provided in each case on the face of the pump end protruding into the transmission housing 62, 64 (see pressure-side outlet $A_{SD}$ of the pump suction stages SS, intake $A_{DS}$ of the pump pressure stages DS, pressure-side outlets $A_{DD1}$, outlet $A_{DD2}$ of the pump pressure stages DS).

In a proposed third embodiment of the plug-in pump solution however (see FIG. 5), both an oil tank 26 and a dry sump 24$_I$, 24$_{II}$, which is divided by a wall W, are formed in the interior of the transmission housing 62, 64. The oil tank 26 is furthermore sealed accordingly against the dry sump 24 (see seal DI). Two pump suction stages SS are arranged between an electric motor M, arranged on the transmission wall side, and two pump pressure stages DS. The hydraulic connection of the two pump suction stages SS (see intake $A_{SS1}$, intake $A_{SS1}$ of the pump suction stages SS) to the dry sump 24$_I$, 24$_{II}$ firstly, and of the two pump pressure stages DS to the oil tank 26 secondly (intake $A_{DA1}$, intake $A_{DA2}$ of the pump pressure stages DS), are each designed radially to the pump housing PG. The hydraulic connection of the pressure-side outlet $A_{SD}$ of the two pump suction stages SS also leads into the oil tank 26, radially with respect to the pump housing PG. The pump pressure stages DS are accordingly sealed circumferentially against the pump suction stages SS (see seal DI). A hydraulic connection of the plug-in pump solution to the two above-mentioned consumers $V_1$, $V_2$ is provided in each case on the face of the pump end protruding into the transmission housing 62, 64 (see outlet $A_{DD1}$, outlet $A_{DD2}$ of the pump pressure stages DS).

The common feature of all these embodiments is that a motor electronic unit ME is arranged outside the transmission housing 62, 64 (see FIG. 3, FIG. 4, FIG. 5, in each case on the right of the flange connection). This allows firstly simple electrical contacting of the electric motor or motor electronic unit ME, and secondly a corresponding heat exchange from the motor electronic unit ME to the environment.

Figure 6:
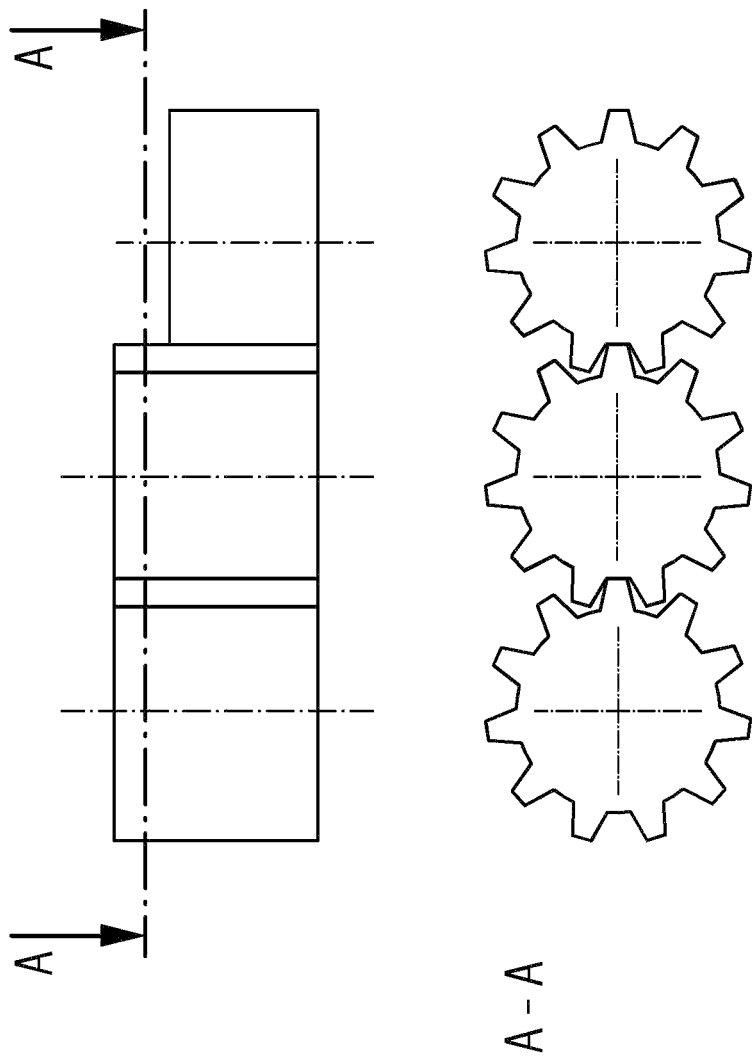
FIG. 6 is an illustration of gearwheel designs.

FIG. 6 illustrates a design of three intermeshing external gearwheels forming two pump suction stages or pump pressure stages, wherein preferably the middle gearwheel is the driven gearwheel. All three gearwheels of this external gearwheel assembly have the same cross-sectional geometry, i.e. also the same number of teeth. The two outer gearwheels also have the same axial distance from the middle gearwheel. Only the right-hand gearwheel for example has a shorter longitudinal extent than the other two gearwheels. In principle, these axial spacings could also be different. Also, the number of teeth of the two outermost external gearwheels could be set differently from that of the inner external gearwheel.

FIG. 7 illustrates schematically as an example a division and intermixing of delivery flows, as formed firstly with respect to the two pump suction stages (see $ZA_1$) and secondly with respect to the two pump pressure stages (see $ZA_2$) within the pump housing PG. Whereas the two pump suction stages convey an air flow or oil-air flow from the dry sump 24$_I$, 24$_{II}$ (region 24$_I$, region 24$_{II}$) into the oil tank 26, the two pump pressure stages each convey an oil flow from the oil tank 26 to the respective assigned consumer $V_1$, $V_2$. The individual thicknesses of the arrows qualitatively illustrate a corresponding delivery volume flow. In principle, the respective inflows and outflows of the individual pump stages may be established as required, in particular via a corresponding design of the external gearwheels (for this, see the individual different gearwheel lengths in FIG. 7).

The plug-in pump solutions described in the context of this disclosure each allow a very compact pump solution suitable for the described flanging to the vehicle transmission $V_1$. The number of rotating components is kept to a minimum, which is associated with a reduction in friction losses. Also, weight is saved.

The plug-in pump solutions described each allow implementation of a dry sump system with only six external gearwheels.

It is also pointed out that the exemplary embodiments shown are merely examples which in no way restrict the scope of protection, the applications or design. Instead, the above description gives a person skilled in the art a guideline for the realization of at least one exemplary embodiment, and various changes can be made here, in particular with regard to the function and arrangement of the component parts described, without departing from the scope of protection resulting from the claims and feature combinations equivalent thereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A pump stage assembly configured to supply a lubricating oil to at least one consumer, comprising:
   a pump housing;
   at least two pump suction stages formed by a first external gearwheel assembly of at least three intermeshing external gearwheels that lie in a first plane, wherein one of the at least three intermeshing external gearwheels has an axial height different than the other two, and configured to:
      draw in the lubricating oil from a first oil container functioning as a dry sump, and
      deliver the lubricating oil to a second oil container functioning as an oil tank; and
   at least one pump pressure stage formed by a second external gearwheel assembly of two intermeshing external gearwheels which lie in a second plane, wherein each of the two intermeshing external gearwheels have different axial heights, and configured to:
      draw in the lubricating oil from the second oil container, and
      deliver the lubricating oil to a consumer,
   wherein the at least two pump suction stages and the at least one pump pressure stage are arranged spaced apart from one another in the pump housing and have a common drive shaft,
   wherein the first plane and the second plane lie parallel to one another,
   wherein at least two respective tooth center points of the first external gearwheel assembly and respective tooth center points of the second external gearwheel assembly are arranged in a common plane that intersects the pump housing in a longitudinal direction and lies orthogonal to the first and second planes.

2. The pump stage assembly as claimed in claim 1, wherein at least two pump pressure stages are provided formed by the second assembly of at least three intermeshing external gearwheels, wherein the at least two respective tooth center points of the first external gearwheel assembly and at least two of the respective tooth center points of the second external gearwheel assembly are arranged in the common plane.

3. The pump stage assembly as claimed in claim 1, wherein the respective tooth center points of all gearwheels of the first external gearwheel assembly and the respective tooth center points of all gearwheels of the second external gearwheel assembly are arranged in the common plane.

4. The pump stage assembly as claimed in claim 1, wherein the first oil container and/or the second oil container forms an oil reservoir in an interior of an at least one-stage or two-stage transmission for driving a vehicle.

5. The pump stage assembly as claimed in claim 1, wherein the pump stage assembly is configured as part of a plug-in pump solution for arrangement on an at least one-stage or two-stage transmission for driving a vehicle, wherein the plug-in pump solution is flanged to a transmission housing of the transmission and protrudes into the transmission housing.

6. The pump stage assembly as claimed in claim 5, wherein the plug-in pump solution is configured as a substantially cylindrical body.

7. The pump stage assembly as claimed in claim 6, wherein a hydraulic connection of the pump suction stages and/or the at least one pump pressure stage to an oil reservoir is designed radially to the respective portion of the pump housing.

8. The pump stage assembly as claimed in claim 7, wherein a hydraulic connection to a pressure side of the at least one pump pressure stage is provided on a face of an end of the pump housing protruding into the transmission housing.

9. The pump stage assembly as claimed in claim 8, wherein a hydraulic connection to a suction side of the pump suction stages is provided on the face of the end of the pump housing protruding into the transmission housing.

10. The pump stage assembly as claimed in claim 8, wherein a hydraulic connection to the pressure side of the pump suction stages and to a suction side of the at least one pump pressure stage is provided on the face of the end of the pump housing protruding into the transmission housing.

11. The pump stage assembly as claimed in claim 1, wherein the first oil container is divided into at least two regions by at least one wall.

12. The pump stage assembly as claimed in claim 1, wherein the common drive shaft is driven by an electric motor and/or mechanically.

13. The pump stage assembly as claimed in claim 12, wherein the pump stage assembly is configured to cool an electric motor driving an electric vehicle.

14. The pump stage assembly as claimed in claim 1, wherein the pump stage assembly supplys lubricating oil to an at least one-stage or two-stage transmission for driving a vehicle.

15. A multiple action, external gear pump having a pump stage assembly configured to supply a lubricating oil to at least one consumer, comprising:
   a pump housing;
   at least two pump suction stages formed by a first external gearwheel assembly of at least three intermeshing external gearwheels that lie in a first plane, wherein one of the at least three intermeshing external gearwheels has an axial height different than the other two, and configured to:
  draw in the lubricating oil from a first oil container functioning as a dry sump, and
  deliver the lubricating oil to a second oil container functioning as an oil tank; and
at least one pump pressure stage formed by a second external gearwheel assembly of two intermeshing external gearwheels which lie in a second plane, wherein each of the two intermeshing external gearwheels have different axial heights, and configured to:
  draw in the lubricating oil from the second oil container, and
  deliver the lubricating oil to a consumer,
wherein the at least two pump suction stages and the at least one pump pressure stage are arranged spaced apart from one another in the pump housing and have a common drive shaft,
wherein the first plane and the second plane lie parallel to one another,
wherein at least two respective tooth center points of the first external gearwheel assembly and respective tooth center points of the second external gearwheel assembly are arranged in a common plane that intersects the pump housing in a longitudinal direction and lies orthogonal to the first and second planes.

16. A vehicle transmission for driving a vehicle, wherein the vehicle transmission has a pump stage assembly configured to supply a lubricating oil to at least one consumer, comprising:
  a pump housing;
  at least two pump suction stages formed by a first external gearwheel assembly of at least three intermeshing external gearwheels that lie in a first plane, wherein one of the at least three intermeshing external gearwheels has an axial height different than the other two, and configured to:
    draw in the lubricating oil from a first oil container functioning as a dry sump, and
    deliver the lubricating oil to a second oil container functioning as an oil tank; and
  at least one pump pressure stage formed by a second external gearwheel assembly of two intermeshing external gearwheels which lie in a second plane, wherein each of the two intermeshing external gearwheels have different axial heights, and configured to:
    draw in the lubricating oil from the second oil container, and
    deliver the lubricating oil to a consumer,
  wherein the at least two pump suction stages and the at least one pump pressure stage are arranged spaced apart from one another in the pump housing and have a common drive shaft,
  wherein the first plane and the second plane lie parallel to one another,
wherein at least two respective tooth center points of the first external gearwheel assembly and respective tooth center points of the second external gearwheel assembly are arranged in a common plane that intersects the pump housing in a longitudinal direction and lies orthogonal to the first and second planes.

* * * * *